Feb. 17, 1959   L. A. SAFFORD   2,873,760
SAFETY VALVE
Filed Jan. 6, 1958

INVENTOR
*Lewis A. Safford*

BY
ATTORNEYS

United States Patent Office 2,873,760
Patented Feb. 17, 1959

2,873,760
SAFETY VALVE

Lewis A. Safford, Watertown, N. Y., assignor to The New York Air Brake Company, a corporation of New Jersey Application January 6, 1958, Serial No. 707,180

3 Claims. (Cl. 137—529)

This invention relates to safety valves and will be shown as embodied in a large-capacity valve for dissipating over-pressure in the main reservoir of an air brake system.

In this field the standards for performance are high, and erratic valves that buzz have plagued the air brake industry for years. Aside from the noise, buzzing causes excessive wear and accelerates depreciation of the valve and its seat, with consequent increase in the expense of maintenance.

The valve element of a spring-loaded safety valve should be accurately guided, but must be capable of limited universal tilt to the end that it may seat closely.

The invention provides a valve which is guided substantially at the plane of its seat and guided so that it has the necessary freedom to tilt. The guiding is such that any final tilting motion into annular contact with the seat entails no significant sliding motion in contact with the seat.

The use of the invention does not conflict with the use of customary features such as adjustable loading, adjustable blow-down, interchangeable seats, self-centering loading spring, etc. The exemplary embodiment now about to be described includes such features, and shows one commercially acceptable embodiment of the inventive concept which has been built and successfully tested. Modifications to meet special conditions are contemplated:

Figure 1:
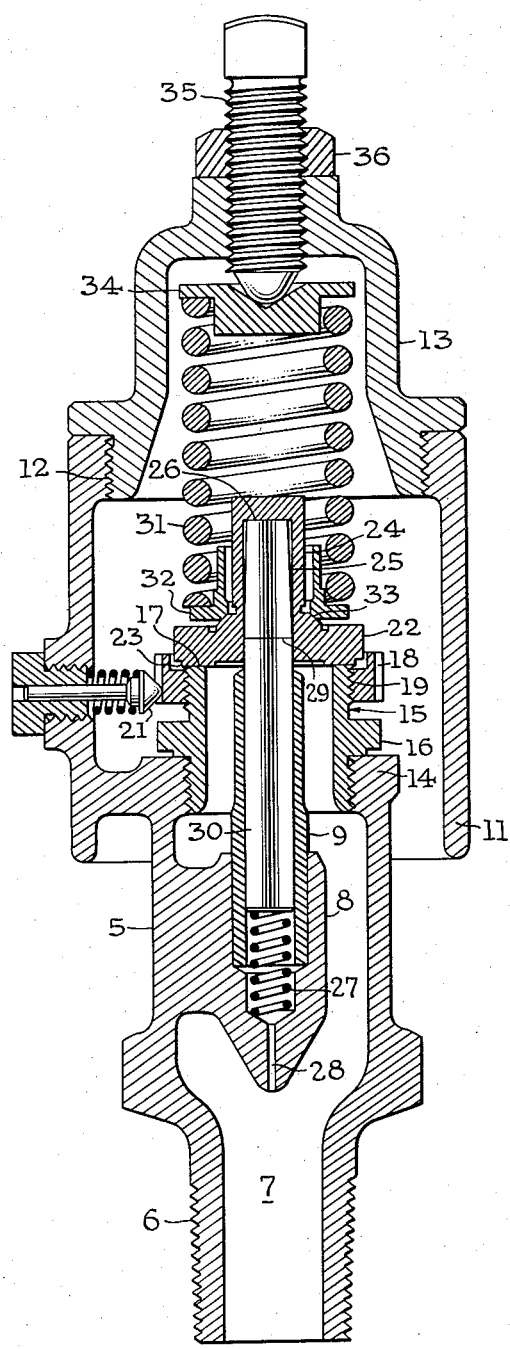
Fig. 1 is an axial section of a safety valve designed to avail of the invention.

The body 5 of the valve has a pipe-threaded nipple 6 and a passage 7 which not quite completely encircles a hub 8 carried by body 5. In hub 8 a guide tube 9 is fixed. Formed integrally with body 5 is a generally cylindrical exhaust skirt 11 which is bored and threaded at 12 to receive the cup-like closure 13.

The body 5, nipple 6, guide tube 9, skirt 11 and closure 13 desirably have outer surfaces which are coaxial surfaces of revolution. The skirt protects the valve mechanism from the weather and is open at its bottom to permit discharge flow, and direct it in paths parallel with the axis. Such valves are customarily but not necessarily mounted with the axis vertical and statements of direction in this description assume such mounting.

Except for the guide tube 9, the construction so far described conforms to conventional practice.

The passage 7 leads to a bored and threaded hub 14 coaxial with the bore of guide tube 9 and screwed into this hub is the tubular valve seat unit 15 which, near mid-length, has an annular flange 16. This flange seats against the upper face of hub 14. The upper end of valve seat 15 is a plane surface 17 normal to the axis of guide tube 9 and slightly above the upper end of tube 9. This plane surface 17 is the valve-seat proper.

A reaction ring 18 of familiar type is threaded at 19 on the upper portion of the valve seat unit 15, and has a serrated (milled) periphery, so that it will be retained in adjusted positions by the spring-urged impositive detent 21. Adjustment of the reaction ring controls blowdown.

The valve may be loosely described as "hat shaped," and comprises a disc 22 with a rim 23 which is annular, stands proud of the lower face of disc 22 and is dimensioned to seat on the plane seat-surface 17. Coaxial with disc 22 is an upward extension 24 into which extends, from the bottom of disc 22, a cylindrical axial bore 25. The bore 25 ends in a plane surface 26 normal to the axis of bore 25.

The guide stem 30 makes a good sliding fit in the bore of guide tube 9 and seats at its lower end on the coil compression spring 27. The spring chamber thus formed is vented at 28. The upper end of stem 30 is formed with a slight taper starting at line 29.

The parts are so dimensioned that when valve disc 22 is closed against its seat 17 (see Fig. 1) line 29 is above the plane of valve seat 17; also the cylindrical portion of stem 30 fits the bore 25 freely enough to accommodate the tilt permitted by the taper of stem 30 above line 29.

Figure 2:
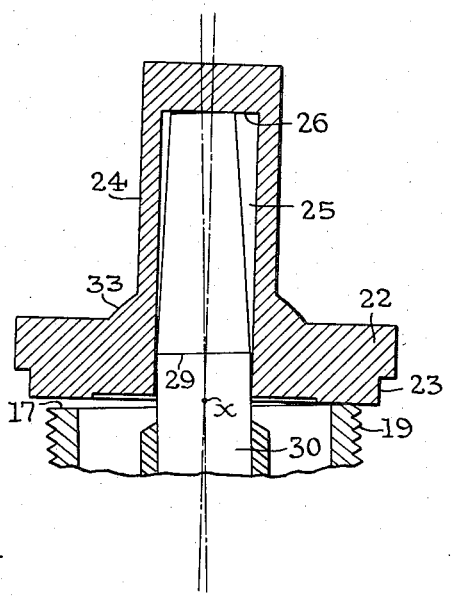
Fig. 2 shows the valve, valve seat and valve guide on a somewhat larger scale, with the valve tilted to an exaggerated degree as indicated by axial center lines of the valve and its guide. These lines intersect just above the plane of the valve seat and their intersection defines, with a reasonable degree of precision, the point about which the valve tilts.

The valve 22 is consequently quite accurately centered when open as well as when closed. If the valve has tilted when open, closing motion will restore the normal alignment. Since stem 30 follows the valve in its opening movement and maintains it centered, and since the taper above line 29 limits the angle of tilt, the valve will commence to rock into annular contact with seat 17 as soon as one side of the valve has engaged the seat, and will do so with minimum sliding motion relatively to the seat. The diagram, Fig. 2, will clarify this point.

The loading spring 31 engages at its lower end a spring seat 32 universally tiltable on a spherical boss 33 formed on disc 22. The spring seat is consequently self-aligning. The upper end of spring 31 reacts against a seat 34 adjustable by turning a thrust screw 35, which normally is locked by a jam nut 36.

The essence of the concept is that the valve is centered by means effective close to the plane of its seat, and the valve is free to tilt universally about a point X, which is on the axis of stem 30 and moves with stem 30 so as to be at least approximately in the plane of seat 17 when the valve is closed. The center of the spherical boss 33 substantially coincides with point X. The valve is not pinned to stem 30 but has thrust engagement with the upper end of that stem. Such engagement is maintained by the opposed reactions of springs 27 and 31. Thus the spring 31 develops no tilting moment on the valve when open or when closed. It does develop a restoring moment on a tilted valve during at least the terminal portion of its closing motion.

The geometrical relations above set forth can be departed from within reasonable limits without destroying the advantages offered by the invention. They point the way to precise performance.

What is claimed is:

1. A pressure relief valve comprising in combination, a body having an annular seat which surrounds a flow port; a poppet valve having an annular surface adapted to seal against said annular seat and close said flow port, said seal lying at least approximately in a plane hereinafter called the sealing plane and separating the pressure side from the discharge side of the valve; guiding means located on the pressure side of the valve and comprising means affording two guideways which are aligned and normal to the sealing plane when the valve is closed, one a fixed guideway carried by the body and extending nearly to the sealing plane and the other a movable guideway formed in the valve and extending nearly to the sealing plane; a guide stem making a close sliding fit in the fixed guideway and a slightly looser fit in the movable guideway, said stem having, wholly within the movable guideway, an end taper dimensioned to limit tilt of the valve and extending to a thrust surface on the end of the stem, said surface being adapted to engage a thrust surface carried by the movable guideway; dominant yielding means urging the valve toward the seat; and yielding means urging the guide stem into thrust engagement with the valve.

2. The combination defined in claim 1 in which the dominant yielding means is on the discharge side of the valve and reacts on the valve through a universal thrust surface.

3. In a relief valve, the combination of a valve body having a plane poppet-valve seat ported to define a flow path through the body; a poppet valve normally seated against said seat to close said flow path and movable in directions approximately normal to the plane of said seat away from said seat by the fluid pressure to be relieved; a hollow guideway in said valve, extending substantially from the seated face of said valve, in a direction normal thereto, part-way through the valve and there terminating in a thrust surface substantially parallel with the seated face of the valve; yielding means urging said poppet valve to its seated position; means supported by said valve body and affording a guideway normal to the plane of the valve seat, extending through said seat nearly to the plane of the seated face of the poppet valve, when the latter is closed; a stem closely confined but slidable in the last-named axial guideway, projecting therefrom into slightly less close confinement in the hollow guideway in the poppet valve and entering into end thrust relation with said thrust surface; yielding means weaker than the first-named yielding means urging said stem toward the valve; and means comprising a taper on that terminal portion of the stem which enters the hollow guideway in the valve, to afford clearance for limited universal tilting freedom to the poppet valve, said taper being shorter than said hollow guideway.

References Cited in the file of this patent

UNITED STATES PATENTS

| | | |
|---|---|---|
| 1,668,075 | Hellwig | May 1, 1928 |
| 2,622,613 | McNeal | Dec. 23, 1952 |